_United States Patent Office_

3,810,922
Patented May 14, 1974

3,810,922
SULFUR-CONTAINING 4-HYDROXYCOUMARINS
AND THEIR SALTS
Joseph E. Dunbar, Midland, Mich., assignor to The Dow
Chemical Company, Midland, Mich.
No Drawing. Filed Dec. 18, 1972, Ser. No. 316,419
Int. Cl. C07d 7/30
U.S. Cl. 260—343.2 R                    19 Claims

ABSTRACT OF THE DISCLOSURE

Invention concerns sulfur-containing 4-hydroxy-coumarins and their alkali metal salts of the formula

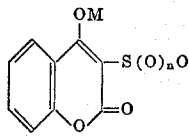

wherein M is hydrogen or alkali metal, R is alkyl, ω-(cyclohexyl)-n-lower alkyl, benzyl, halobenzyl, lower alkylbenzyl, (trifluoromethyl)benzyl, nitrobenzyl, allyl, haloallyl, phenyl-lower alkyl or naphthyl-lower alkyl, and $n$ is 0, 1 or 2. The compounds are prepared by reacting 4-hydroxycoumarin with a thiolsulfonate in an organic medium and recovering the product. The compounds are useful as plant growth stunters and as antimicrobial agents.

SUMMARY OF THE INVENTION

This invention concerns sulfur-containing 4-hydroxycoumarins and their alkali metal salts corresponding to the formula

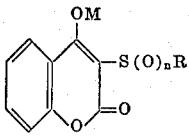

wherein M represents hydrogen or alkali metal, R represents alkyl of from 1 to 20 carbon atoms, ω-(cyclohexyl)-n-lower alkyl, benzyl, halobenzyl, lower alkylbenzyl, (trifluoromethyl)benzyl, nitrobenzyl, allyl, haloallyl, phenyl-lower alkyl or naphthyl-lower alkyl. In the specification and claims, "alkyl" designates a straight or branched chain 1 to 20 carbon alkyl group, "lower alkyl" designates a straight or branched chain 1 to 4 carbon alkyl group and "halo" designates fluoro, chloro or bromo and $n$ is 0, 1 or 2.

The compounds are prepared by reacting an alkali metal salt of 4-hydroxycoumarin with a thiolsulfonate having an R moiety as identified above and the resulting thio compound, if desired, is oxidized with hydrogen peroxide to the corresponding sulfinyl or sulfonyl compound according to the following procedures.

GENERAL PROCEDURE FOR MAKING 3-ALKYL-
(OR ARYL)-THIO-4-HYDROXYCOUMARINS

A mixture of 4-hydroxycoumarin, a base such as an alkali metal hydroxide or a basic tertiary amine, a thiolsulfonate (i.e., an alkyl or aryl ester of an alkane- or arenethiosulfonic acid), water and a water-miscible solvent, such as, for example, methanol, ethanol, 2-propanol, acetonitrile, acetone or methyl ethyl ketone, is stirred at a temperature between about 20° C. and up to the boiling temperature of the aqueous solvent in the reaction mixture for a period of time of from 30 minutes to 48 hours. Following the reaction period, the aqueous solvent mixture is evaporated, and the residue is washed with water to remove the by-product sulfinic acid salt. If the product crystallizes at this point, it is collected on a filter. If it remains an oil, it is dissolved in a water-immiscible solvent, such as, for example, ethyl ether, chloroform, methylene chloride, carbon tetrachloride, benzene, toluene, xylene or 1,1,1-trichloroethane, and the resulting solution is then dried over a suitable drying agent such as anhydrous sodium sulfate, anhydrous magnesium sulfate or anhydrous calcium sulfate. Following the drying procedure, the solvent is removed by evaporation or by distillation, and the residual crude product is purified by crystallization from an appropriate solvent, such as, for example, toluene, cyclohexane, n-hexane, ethanol, aqueous ethanol, methanol, aqueous methanol, 2-propanol, aqueous 2-propanol, benzene, toluene or mixtures thereof.

GENERAL PROCEDURE FOR MAKING 3-ALKYL-
(OR ARYL-)-SULFINYL-4-HYDROXYCOUMARINS

A solution of the 3-alkyl-(or aryl-)thio-4-hydroxycoumarin, a substantially molar equivalent of hydrogen peroxide and enough glacial acetic acid to permit complete solution is allowed to remain at ambient temperature for about 30 minutes to about 48 hours. After the reaction period, the mixture is poured into ice water, and the precipitated crude solid product is collected on a filter, washed with water and dried. The product thus obtained may be of suitable purity; or, if not, it is purified by recrystallization from an appropriate solvent such as n-hexane, cyclohexane, methylcyclohexane, benzene, toluene, xylene, methanol, aqueous methanol, ethanol, aqueous ethanol, 2-propanol, aqueous 2-propanol or combinations thereof.

GENERAL PROCEDURE FOR MAKING 3-ALKYL-
(OR ARYL)-SULFONYL - 4 - HYDROXYCOUMARINS

A solution of the 3-alkyl-(or aryl-)thio-4-hydroxycoumarin or the 3-alkyl-(or aryl-)sulfinyl-4-hydroxycoumarin, a substantially two molar equivalent of $H_2O_2$ with the former reactant or a substantially one molar equivalent of $H_2O_2$ with the latter reactant and glacial acetic acid is allowed to stand at ambient temperature for about 2 to about 48 hours, or it is heated at about 40 to about 115° C. for a period of time of about one minute to about two hours. After the reaction period, the mixture is poured into ice water, the precipitated product is collected on a filter, washed with water and dried. The product thus obtained, may be of suitable purity; or, if not, it is purified by recrystallization from an organic solvent, i.e., n-hexane, cyclohexane, methylcyclohexane, benzene, toluene, xylene, methanol, aqueous methanol, ethanol, aqueous ethanol, 2-propanol, aqueous 2-propanol or appropriate combinations thereof.

DESCRIPTION OF SOME PREFERRED
EMBODIMENTS

The following examples illustrate the present invention and the manner and process of making and using the same but should not be construed as limitative of the overall scope of the same. Temperatures given are in centigrade degrees. The compounds are identified by one or more of elemental analysis, infrared (IR) and nuclear magnetic resonance (NMR) spectra.

Example 1: 3-benzylthio-4-hydroxycoumarin 4-hydroxycoumarin (16.2 g., 0.100 mol) was dissolved in 200 ml. ethanol. An aqueous basic solution (4.0 g., 0.10 mol NaOH in 100 ml. water), and benzyl-p-toluene thiolsulfonate (27.8 g., 0.100 mol) was added. The reaction mixture was heated at reflux temperature for 17 hours. After cooling to room temperature the solution was evaporated in vacuo to 50 ml. A white precipitate was recovered, washed with water, and extracted from the aqueous mixture with chloroform. The CHCl$_3$ extracts were dried (Na$_2$SO$_4$) and evaporated in vacuo to recover a light yellow solid, M.P. 130–150° C. Solid was recrystallized from toluene to recover 15.3 g. (53%) of a cream-colored solid, M.P. 153–158° C. One additional recrystallization gave the pure product as a white crystalline solid, M.P. 158–159° C.

*Analysis.*—Calcd. for C$_{16}$H$_{12}$O$_3$S (percent): C, 67.59; H, 4.26; S, 11.28. Found (percent): C, 67.55; H, 4.0; S, 11.1.

Example 2: 4-hydroxy-3-methylthiocoumarin

To a solution of 4-hydroxycoumarin (32.0 g., 0.200 mol) in 400 mol of 2:1 EtOH/H$_2$O mixture was added NaOH (8.0 g., 0.20 mol). After complete solution, methyl-p-toluene thiolsulfonate (40.4 g., 0.200 mol) was added and the mixture was heated at reflux for 22 hours. After cooling to room temperature, the solution was evaporated in vacuo to ca. 100 ml. 200 ml. of H$_2$O were added and the slurry was extracted with 3–75 ml. portions of chloroform. The extracts were dried (Na$_2$SO$_4$), and evaporated in vacuo to recover a solid residue. The solid was extracted with refluxing cyclohexane to recover 11.7 g. (28%) of the desired product, M.P. 102–105° C. One additional recrystallization using cyclohexane-toluene, then diluting the solution with additional cyclohexane gave the pure product, M.P. 104–105.5° C.

*Analysis.*—Calcd. for C$_{10}$H$_8$O$_3$S (percent): C, 57.68; H, 3.87; S, 15.40. Found (percent): C, 57.8; H, 5.01; S, 15.5.

Example 3: 3-n-dodecylthio-4-hydroxycoumarin 4-hydroxycoumarin (8.0 g., 0.050 mol) was added to a 125 ml. solution of ethanol-H$_2$O (2:1) containing NaOH (2.0 g., 0.050 mol). After solution was complete, dodecyl-p-toluene thiolsulfonate (17.8 g., 0.0500 mol) was added and the mixture was heated at steam bath temperature for 18 hours. After cooling to room temperature, the solvents were removed in vacuo and the residue was slurried in water and extracted with chloroform. The extracts were dried (Na$_2$SO$_4$), and evaporated in vacuo to recover an oil which slowly solidified. The solids were recrystallized from n-hexane to recover 4.0 g. (22%) of an off-white solid, M.P. 68–69° C. One additional recrystallization from n-hexane gave the pure compound as tiny crystalline needles, M.P. 68–69° C.

*Analysis.*—Calcd. for C$_{21}$H$_{30}$O$_3$S (percent): C, 69.57; H, 8.34; S, 8.84. Found (percent): C, 69.82; H, 8.25; S, 8.89.

Example 4: 4-hydroxy-3-isopentylthiocoumarin

Aqueous base (8.0 g., 0.20 mol of NaOH and 100 ml. H$_2$O) was added to a slurry of the coumarin in 200 ml. ethanol. To the resulting clear solution was added isopentyl-p-toluene thiolsulfonate (51.6 g., 0.200 mol). The mixture was heated at reflux temperature for 4 hours. After cooling to room temperature, the solvents were evaporated in vacuo. The residue was dissolved in a mixture of CHCl$_3$—H$_2$O. The CHCl$_3$ layer was separated, dried (Na$_2$SO$_4$), and evaporated in vacuo to recover a yellow solid. The solids were recrystallized from cyclohexane-toluene to recover 22.7 g. (43%) of the product as a pale orange crystalline solid, M.P. 99–100° C. One additional recrystallization from cyclohexane gave the pure compound as tiny white crystalline needles, M.P. 105–106° C.

*Analysis.*—Calcd. for C$_{14}$H$_{25}$O$_3$S (percent): C, 63.61; H, 6.10; S, 12.13. Found (percent): C, 63.67; H, 6.09; S, 11.85.

Example 5: 3-allylthio-4-hydroxycoumarin

A solution of base (8.0 g., 0.20 mol of NaOH and 100 ml. H$_2$O) was added to a slurry of 4-hydroxycoumarin (32.4 g., 0.200 mol) in 200 ml. ethanol. To the resulting clear solution was added allyl-p-toluene thiolsulfonate (45.7 g., 0.200 mol). The mixture was then heated at reflux for 4 hours. After cooling to room temperature the solvents were removed in vacuo and the residue was dissolved in a mixture of chloroform-H$_2$O. The CHCl$_3$ layer was separated, dried (Na$_2$SO$_4$), and evaporated in vacuo to recover an oil which solidified upon cooling. The solids were recrystallized from cyclohexane to recover 27.7 g. (57%) of the compound as a light yellow solid, M.P. 94–96° C. One additional recrystallization from cyclohexane gave the pure compound as white crystalline platelets, M.P. 101.5–103° C.

*Analysis.*—Calcd. for C$_{12}$H$_{10}$O$_3$S (percent): C, 61.52; H, 4.30; S, 13.68. Found (percent): C, 61.8; H, 4.44; S, 13.2.

Example 6: 4-hydroxy-3-isopropylsulfinylcoumarin 4-hydroxy-3-isopropylthiocoumarin (4.7 g., 0.020 mol), 30% hydrogen peroxide (2.44 g., 0.0220 mol), and 35 ml. glacial acetic acid were combined and stirred at room temperature for 16.5 hours. The cloudy solution was then poured into 200 ml. ice-water. The resulting white precipitate was collected and dried in vacuo. The solids were recrystallized from cyclohexane to recover 3.5 g. (69%) of the product, M.P. 103–103.5° C.

*Analysis.*—Calcd. for C$_{12}$H$_{12}$O$_4$S (percent): C, 57.13; H, 4.80. Found (percent): C, 57.0; H, 4.82.

Example 7: 3-benzylsulfinyl-4-hydroxycoumarin 3-benzylthio-4-hydroxycoumarin (8.53 g., 0.0300 mol), 30% hydrogen peroxide (3.66 g., 0.0330 mol), and 40 ml. glacial acetic acid were combined and stirred at room temperature for 18 hours. The reaction mixture was then poured into 200 ml. of ice-water and the resulting precipitate filtered and dried in vacuo. The solids were recrystallized from isopropanol to recover 6.2 g. (69%) of the product, M.P. 164–166° C. One additional recrystallization from 2-propanol gave the pure compound as a white crystalline solid, M.P. 167–167.5° C.

*Analysis.*—Calcd. for C$_{16}$H$_{12}$O$_4$S (percent): C, 63.98; H, 4.03; S, 10.68. Found (percent): C, 63.8; H, 4.40; S, 11.0.

Example 8: 4-hydroxy-3-isopentylsulfinylcoumarin 4-hydroxy-3-isopentylthiocoumarin (7.95 g., 0.0300 mol), 30% hydrogen peroxide (3.6 g., 0.033 mol), and 35 ml. glacial acetic acid were combined and stirred at room temperature for 20 hours. The clear solution was poured into 250 ml. of ice water. The resulting pink precipitate was collected and dried in vacuo. The solids were recrystallized from n-hexane to recover 6.0 g. (71%) of the pure compound as an orange crystalline solid, M.P. 87–88.5° C.

*Analysis.*—Calcd. for C$_{14}$H$_{16}$O$_4$S (percent): C, 59.98; H, 5.75; S, 11.44. Found (percent): C, 59.70; H, 5.70; S, 11.45.

Example 9: 3-allylsulfinyl-4-hydroxycoumarin 4-hydroxy-3-allylthiocoumarin (4.68 g., 0.0200 mol), 30% hydrogen peroxide (2.5 g., 0.022 mol), and 40 ml. glacial acetic acid were combined and stirred at room temperature for 19 hours. The reaction mixture was poured into 200 ml. of ice water and the resulting precipitate was collected and dried. The solids were recrystallized from cyclohexane to recover 2.1 g. (41%) of a pale pink crystalline solid, M.P. 86–88° C. One additional recrystallization from cyclohexane gave the pure compound as a white crystalline solid.

*Analysis.*—Calcd. for C$_{12}$H$_{10}$O$_4$S (percent): C, 57.59; H, 4.03; S, 12.81. Found (percent): C, 57.63; H, 4.12; S, 12.85.

Example 10: 4-hydroxy-3-isopropylsulfonylcoumarin 4-hydroxy-3-isopropylthiocoumarin (7.1 g., 0.030 mol), 30% hydrogen peroxide (10.2 g., 0.0900 mol), and 50 ml. of glacial acetic acid were combined and heated at steam bath temperature for 15 minutes. After cooling, the solid which had precipitated was collected and dried. The filtrate was poured into 200 ml. ice water and the resulting precipitate was collected and dried. Solids were combined and recrystallized from a mixture of cyclohexane-toluene to recover 5.2 g. (65%) of the compound as white crystalline needles, M.P. 180.5–182° C.

*Analysis.*—Calcd. for $C_{12}H_{12}O_5S$ (percent): C, 53.72; H, 4.51; S, 11.95. Found (percent): C, 54.0; H, 4.5; S, 11.9.

Example 11: 3-benzylsulfonyl-4-hydroxycoumarin 3-benzylthio-4-hydroxycoumarin (8.55 g., 0.0300 mol), 30% hydrogen peroxide (10.2 g., 0.09 mol), and 50 ml. glacial acetic acid were combined and heated on a steam bath for 20 minutes. The mixture was cooled and poured into 200 ml. ice water to recover 7.0 g. of a white solid, M.P. 164–170° C. NMR showed a mixture of the sulfoxide and sulfone. The solid was added to 50 ml. glacial acetic acid and 30% hydrogen peroxide (1.0 g.) was added. The mixture was heated for 15 minutes on a steam bath, cooled, and poured into 200 ml. of ice water, the resulting pale pink solid was collected and dried. One recrystallization from isopropanol gave 4.6 g. (48%) of the desired compound, M.P. 175–177° C. One additional recrystallization from isopropanol gave the pure compound as a white crystalline solid, M.P. 179.5–180.5° C.

*Analysis.*—Calcd. for $C_{16}H_{12}O_5S$ (percent): C, 60.75; H, 3.82; S, 10.13. Found (percent): C, 60.95; H, 3.91; S, 10.2.

Example 12: 4-hydroxy-3-isopropylthiocoumarin 4-hydroxycoumarin (8.1 g., 0.050 mole) was added to 100 ml. of ethanolwater (2:1 by volume), and to the mixture was added 2.0 g. (0.050 mole) of sodium hydroxide followed by 11.5 g. (0.050 mole) of isopropyl p-toluenethiolsulfonate. The reaction mixture was heated under reflux for 16 hours, after which interval of time the solvent was removed by evaporation in vacuo. The solid residue was shaken with 100 ml. of water to dissolve the by-product sodium p-toluenesulfinate, and the aqueous mixture was extracted with five 50 ml. portions of chloroform. The combined chloroform extracts were dried over anhydrous sodium sulfate, and the chloroform was removed from the filtered, dried extract by evaporation in vacuo. The residual substance was crystallized from aqueous ethanol to give 6.5 g. (55%) pale yellow crystals, M.P. 121–124° C. A second recrystallization from aqueous ethanol gave the pure product 4-hydroxy-3-isopropylthiocoumarin as pale yellow platelets, M.P. 126–127° C.

*Analysis.*—Calcd. for $C_{12}H_{12}SO_3$ (percent): C, 61.00; H, 5.12; S, 13.57. Found (percent): C, 61.1; H, 5.40; S, 13.10.

Example 13: 4-hydroxy-3-isopropylthiocoumarin

To a suspension of 200 g. (1.09 moles) of the sodium salt of 4-hydroxy coumarin suspended in 1200 ml. of methylene chloride was added dropwise a solution of isopropanesulfenyl chloride (prepared from 85.8 g. of isopropyl disulfide and 40.5 g. of chlorine) in 160 ml. of methylene chloride, keeping the temperature of the reaction mixture between 10 and 20° C. (After about two-thirds of the sulfenyl chloride had been added 53 g. of anhydrous sodium carbonate was added, and addition was continued.) After the addition was complete, the reaction mixture was stirred at ice bath temperature for 1.5 hours, after which period of time the solvent was removed by distillation in vacuo. The solid residue was extracted with hot ethanol and filtered. The hot filtrate was diluted with water and the solution cooled to give 101 g., (39%) of pale yellow crystals, M.P. 122–126° C. Recrystallization from aqueous ethanol gave pale yellow platelets, M.P. 126–127° C.

Example 14: 4-hydroxy-3-[2-(methylthio)ethylthio]coumarin

To a stirred suspension of 16.2 g. (0.100 mole) of 4-hydroxycoumarin in 250 ml. of ethanol and 125 ml. of water was added 4.0 g. (0.10 mole) of sodium hydroxide with stirring. When complete solution had been effected, 18.6 g. (0.100 mole) of 2-(methylthio)ethyl methanethiolsulfonate was added, and the resulting solution was heated under reflux with stirring for 4.5 hours, after which time the aqueous ethanolic solvent was removed by evaporation in vacuo, leaving an oily residue. The residue was washed with water and extracted with methylene chloride. The extract was washed twice with water, dried over anhydrous sodium sulfate and evaporated to dryness in vacuo, leaving an amber gum, which crystallized when triturated with methylcyclohexane. The crude substance was recrystallized from a mixture of methylcyclohexane and benzene to give 10.2 g. (38%) of white solid, M.P. 92–95° C. Concentration of the mother liquor yielded 4.5 g. more product; total yield: 14.7 g. (55%). A second recrystallization from a mixture of methylcyclohexane and benzene gave the pure product as white crystals, M.P. 96–97.5° C.

*Analysis.*—Calcd. for $C_{12}H_{12}O_3S_2$ (percent): C, 53.71; H, 4.51; S, 23.90. Found (percent): C, 53.90; H, 4.68; S, 23.49.

Example 15: 4-hydroxy-3-isobutylthiocoumarin

A solution of 4.0 g. (0.10 mole) of sodium hydroxide in 125 ml. of water was added to a solution of 16.2 g. (0.100 mole) of 4-hydroxycoumarin and 24.4 g. (0.100 mole) of isobutyl p-toluenethiolsulfonate in 250 ml. of ethanol. The resulting solution was heated under reflux with stirring for 11 hours and allowed to cool to room temperature. The solvent was removed by evaporation in vacuo, leaving a mushy, solid residue which was recrystallized from ethanol to give 10.4 g. (58%) of white platelets, M.P. 131.5–133.5° C. A second recrystallization from ethanol gave the pure product 4-hydroxy-3-isobutylthiocoumarin as white platelets, M.P. 133.5–134.5° C.

*Analysis.*—Calcd. for $C_{13}H_{14}O_3S$ (percent): C, 62.38; H, 5.64; S, 12.81. Found (percent): C, 62.2; H, 5.72; S, 12.65.

Example 16: 3-cyclohexylmethylthio-4-hydroxycoumarin

To a solution of 16.2 g. (0.100 mole) of 4-hydroxycoumarin in 250 ml. of ethanol was added a solution of 4.0 g. (0.10 mole) of sodium hydroxide in 125 ml. of water followed by 28.4 g. (0.100 mole) of cyclohexylmethyl p-toluenethiolsulfonate. The reaction mixture was heated under reflux for 12 hours, after which period of time the solvent was removed by evaporation in vacuo. The residue was vigorously shaken with ca. 400 ml. of water, and the water-insoluble white solid product was collected on a filter and dried. The crude product was recrystallized from ethanol to give 11.9 g. (41%) of white crystals, M.P. 135–136° C. A second recrystallization from ethanol gave the pure product 2-cyclohexylmethylthio-4-hydroxycoumarin as white crystals, M.P. 136–137° C.

*Analysis.*—Calcd. for $C_{16}H_{18}O_3S$ (percent): C, 66.18; H, 6.25; S, 11.04. Found (percent): C, 66.27; H, 6.07; S, 11.04.

Example 17: 3-(4-chlorobenzylthio)-4-hydroxycoumarin

To a solution of 40.0 g. (0.128 mole) of p-chlorobenzyl p-toluenethiolsulfonate and 20.7 g. (0.128 mole) of 4-hydroxycoumarin in 250 ml. of ethanol was added a solution of 5.2 g. (0.13 mole) of sodium hydroxide in 125 ml. of water. The reaction mixture was heated under reflux for 22 hours after which period of time the solvent was removed from the reaction mixture by evaporation in vacuo. The solid residue was shaken with water to dissolve the sodium p-toluenesulfinate by-product and was collected on a filter. The crude, wet product was crystallized from ethanol to give 19.6 g. (48%) of white, crystalline solid, M.P. 167–171° C. Recrystallization from ethanol gave the pure product as white crystals, M.P. 172–174.5° C.

Analysis.—Calcd. for $C_{16}H_{11}ClO_3S$ (percent): C, 60.28; H, 3.48; S, 10.06. Found (percent): C, 60.33; H, 3.47; S, 10.06.

Example 18: 3-benzylthio-4-hydroxycoumarin sodium salt 3-benzylthio-4-hydroxycoumarin (5.0 g., 0.018 mole) and 0.7 g. (0.02 mole) of sodium hydroxide were stirred at room temperature in 50 ml. of ethanol. Shortly after solution was effected, the product salt precipitated and was collected on a filter and dried; weight, 4.5 g. (83%), cream colored crystals, M.P. 114–116° C. (dec.).

Example 19: 4-hydroxy-3-(4-methylbenzylthio)-4-hydroxycoumarin

To a solution of 40.0 g. (0.137 mole) of p-methylbenzyl p-toluenethiolsulfonate and 22.2 g. (0.137 mole) of 4-hydroxycoumarin in 250 ml. of ethanol was added a solution of 5.5 g. (0.14 mole) of sodium hydroxide in 125 ml. of water. The reaction mixture was heated under reflux for 19 hours, after which period of time the solvent was removed by evaporation in vacuo, leaving a mushy solid, which was shaken with water to remove the water-soluble by-product, sodium p-toluenesulfinate. The crude substance was collected on a filter and crystallized from ethanol to give 21.0 g. (51%) of white crystals, M.P. 149–152° C. Recrystallization from ethanol gave the pure product as white crystals, M.P. 153.5–154.5° C.

Analysis.—Calcd. for $C_{17}H_{14}O_3S$ (percent): C, 68.44; H, 4.73; S, 10.75. Found (percent): C, 68.28; H, 4.72; S, 10.67.

Example 20: 3-(2-chloroallylthio)-4-hydroxycoumarin

To a solution of 32.4 g. (0.200 mole) of 4-hydroxycoumarin in 360 ml. of ethanol was added a solution of 8.0 g. (0.20 mole) of sodium hydroxide in 180 ml. of water followed by 52.6 g. (0.200 mole) of 2-chloroallyl p-toluenethiolsulfonate. The reaction mixture was heated under reflux with stirring for 24 hours, after which period of time the solvent was removed by evaporation in vacuo. The semisolid residue was shaken with water to remove the sodium methane-sulfinate by-product and was then extracted with methylene chloride. The methylene chloride extract was dried over anhydrous sodium sulfate, and the methylene chloride was removed by evaporation in vacuo, leaving 54 g. of orange, mushy solid. Three recrystallizations from ethanol gave the pure product as straw-colored crystals, M.P. 144–145° C.

Analysis.—Calcd. for $C_{12}H_9ClO_3S$ (percent): C, 53.63; H, 3.38; S, 11.93. Found (percent): C, 53.85; H, 3.56; S, 12.00.

Example 21: 4-hydroxy-3-(4-nitrobenzylthio)coumarin

To a solution of 16.2 (0.100 mole) of 4-hydroxycoumarin in 180 ml. of ethanol was added a solution of 4.0 g. (0.10 mole) of sodium hydroxide in 90 ml. of water followed by 24.7 g. (0.100 mole) of 4-nitrobenzyl methanethiolsulfonate. The mixture was heated under reflux with stirring for eight hours, after which period of time the solvent was removed by evaporation in vacuo, leaving a solid residue, which was washed with water to remove the water-soluble by-product sodium methanesulfinate, collected on a filter and recrystallized from ethanol to give 14.1 g. (43%) of cream colored solid, m. range 185–202° C. This material was treated with an excess of 5% sodium hydroxide solution, the major portion dissolving, leaving 1.7 g. of pale yellow crystalline solid, M.P. 117–120° C. (M.P. 126° C. after one recrystallization from ethanol), which proved to be 4-nitrobenzyl disulfide. The sodium hydroxide solution was stirred for about 15 minutes at room temperature with activated charcoal and filtered. The filtrate was acidified with dilute hydrochloric acid, and the pale yellow solid precipitate was collected on a filter, dried and twice recrystallized from methyl ethyl ketone to give the pure product as cream colored crystals, M.P. 211–212° C. dec.

Analysis.—Calcd. for $C_{16}H_{11}NO_5S$ (percent): C, 58.35; H, 3.37; N, 4.25. Found (percent): C, 49.91; H, 3.79; N, 8.29.

Example 22: 4-hydroxy-3-(1-naphthylmethylthio) coumarin

To a solution of 16.2 g. (0.100 mole) of 4-hydroxycoumarin in 180 ml. of ethanol was added a solution of 4.0 g. (0.10 mole) of sodium hydroxide in 90 ml. of water followed by 25.2 g. (0.100 mole) of 1-naphthylmethyl methanethiolsulfonate. The mixture was heated under reflux for 20 hours, after which period of time the reaction mixture was allowed to cool to room temperature. The white solid product, which crystallized during the cooling process, was collected on a filter and dried to give a yield of 27.8 (83%). Recrystallization from ethanol gave the pure product as white, fibrous crystals, M.P. 150° C.

Analysis.—Calcd. for $C_{20}H_{14}O_3S$ (percent): C, 71.84; H, 4.22; S, 9.59. Found (percent): C, 72.13; H, 4.15; S, 9.61.

Example 23: 4-hydroxy-3-(isobutylsulfinyl)coumarin

To a solution of 4-hydroxy-3-(isobutylthio)coumarin (10.0 g., 0.04 mole) in glacial acetic acid (100 ml.) was added a solution of 30% hydrogen peroxide (4.6 g., 0.04 mole). The solution was allowed to stand for several days, than was diluted with water, filtered and dried to yield 9.4 g. (83%) of the desired product. Recrystallization from hexane gave the pure product as an off-white solid, M.P. 93–94° C.

Analysis.—Calcd. for $C_{13}H_{14}O_4S$ (percent): C, 58.63; H, 5.30; S, 12.04. Found (percent): C, 58.37; H, 5.21; N, 11.97.

Example 24: 4-hydroxy-3-(isobutylsulfonyl)coumarin 4-hydroxy-3-(isobutylthio)coumarin (10.0 g., 0.04 mole) and a 30% solution of hydrogen peroxide (9.1 g., 0.08 mole) were dissolved in glacial acetic acid (100 ml.) and heated to 90° C. for three hours. The solution was diluted with water, filtered, and the cake dried, giving 7.4 g. (65%) of the desired product. Recrystallization from hexane gave the pure product as white needles, M.P. 102–103° C.

Analysis.—Calcd. for $C_{13}H_{14}O_5S$ (percent): C, 55.30; H, 5.00; S, 11.36. Found (percent): C, 55.64; H, 5.14; S, 11.28.

Example 25: 4-hydroxy-3-(isopropylthio)coumarin, ammonium salt 4-hydroxy-3-(isopropylthio)coumarin was dissolved in concentrated ammonium hydroxide solution (100 ml.) and evaporated to dryness at 6 mm. pressure and 40° C. The residue was dissolved in acetone, and the solid which separated was filtered and dried, giving 7.8 g. (73%) of the pure white solid product, M.P. 190–191° C.

The compounds of this invention are employed as plant growth stunting agents for cereal grasses including wheat and corn, cotton, beans and the like. Some are also useful as antimicrobial agents for the control of *Mycobacterium phlei, Staphylococcus aureus, Trichophyton mentagrophytes* and *Candida albicans*. Some compounds have both types of activity. This is not to suggest that all of the compounds are equally effective against the same organisms or plants or at the same concentrations. Plant growth stunting activity contributes to the health and disease resistance of plants. It is also desirable to facilitate mechanically harvesting of crops. Plant growth stunters are used both in pre-emergent application, i.e., before seeds have sprouted or in foliar application after plant growth has begun. For plant growth control and antimicrobial usage, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solution, oil-in-water or water-in-oil emulsions or aqueous dispersions. The augmented compositions are adapted to be formulated as concentrates and subsequently diluted with additional liquid or solid adjuvants to produce ultimate treating compositions. Good results are obtained when employing compositions containing from about 1 to about 20 pounds per acre of active material for pre-emergent application and from about 0.5 to about $4 \times 10^3$ parts per million (p.p.m.) of active agent for foliar application.

In the following table, data are presented showing the activity of compounds, listed by example number, as plant growth stunters wherein the active agent is used in pre-emergent and foliar applications. Plant growth stunting is measured as the different between normal growth and stunted growth, expressed as a percentage of the normal growth.

TABLE I
PLANT GROWTH STUNTING, PERCENT REDUCTION/APPLICATION RATE

| Pre-emergent Example | Percent reduction/lb./acre | Foliar Example | Percent reduction/p.p.m.×10³ |
|---|---|---|---|
| 4 | Yellow foxtail, 95/10. | 2 | Sorghum, 20/4. |
| 5 | Cotton, 20/2. Cotton, 30/5. Cotton, 40/10. Water grass, 50/10. Yellow foxtail, 50/20. | 6 | Cotton, 60/4. Bindweed, 80/4. Pigweeds, 50/4. |
| 6 | Beans, 60/20. Wild mustard, 80/20. Bindweed, 80/20. | 9 | Cotton, 35/4. |
| 7 | Crabgrass, 50/20. Yellow foxtail, 50/20. | 10 | Soybeans, 30/4. Wild mustard, 50/4. |
| 8 | Corn, 20/10. Beans, 40/20. Wild mustard, 50/20. Bindweed, 90/20. | 12 | Cotton, 36/1. Beans, 38/0.5. Soybeans, 28/1. Soybeans, 53/2. |
| 9 | Beans 50/20. Johnson grass, 80/20. Pigweeds, 90/10. | 14 | Sorghum, 15/4. |
| 10 | Soybeans, 65/5. Soybeans, 95/10. | 15 | Cotton, 30/4. |
|  |  | 18 | Wild mustard, 100/4. |
| 12 | Cotton, 40/10. Beans, 40/5. | 24 | Pigweeds, 30/4. Wild mustard, 45/4. |
| 14 | Crabgrass, 30/20. Barnyard grass, 15/10. | 25 | Beans, 70/4. Cotton, 30/6. Soybeans, 30/10. |
| 15 | Beans, 80/10. Bindweed, 50/12. |  |  |
| 16 | Soybeans, 20/10. Corn, 20/10. |  |  |
| 17 | Crabgrass, 90/20. |  |  |
| 18 | Pigweeds, 100/20. |  |  |
| 19 | Crabgrass, 40/20. Yellow foxtail, 50/20. |  |  |
| 20 | Pigweeds, 100/20. Wild mustard, 100/20. |  |  |
| 21 | Pigweeds, 100/20. |  |  |
| 22 | Crabgrass, 50/20. Yellow foxtail, 30/20. |  |  |
| 23 | White winter wheat, 11/10. Soybeans, 30/2. Cotton, 33/2. Beans, 37/2. |  |  |
| 24 | Pigweeds, 50/20. Wild mustard, 50/20. |  |  |

In the following table, data are presented showing the minimum growth inhibitory concentrations, i.e., for 100% control, of the indicated organisms expressed in parts per million, p.p.m. of antimicrobiial based upon conventional agar plate tests.

TABLE II
Minimum growth inhibitory concentration, p.p.m.

| Example: | Mp | Sa | Tm | Ca |
|---|---|---|---|---|
| 1 | 100 |  |  |  |
| 3 | 10 | 100 | 100 |  |
| 4 | 100 |  |  |  |
| 5 | 100 |  |  |  |
| 11 | 500 |  |  |  |
| 15 |  | 10 |  | 100 |
| 16 | 100 | 100 |  |  |
| 17 |  | 100 |  |  |
| 19 | 100 | 100 |  |  |
| 21 | 100 | 100 |  |  |
| Control | Abundant growth of all organisms |  |  |  |

NOTE.—Mp=Mycobacterium phlei; Sa=Staphylococcus aureus; Tm=Trichophyton mentagrophytes; Ca=Candida albicans.

What is claimed is:

1. A sulfur-containing 4-hydroxycoumarin derivative corresponding to the formula

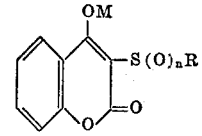

wherein M represents hydrogen or alkali metal, R represents alkyl of from 1 to 20 carbon atoms, ω-(cyclohexyl)-n-lower alkyl, benzyl, halobenzyl, lower alkylbenzyl, (trifluoromethyl)benzyl, nitrobenzyl, allyl, haloallyl, phenyl-lower alkyl or naphthyl-lower alkyl and n is 0, 1 or 2.

2. The compound of caim 1 which is 3-benzylthio-4-hydroxycoumarin.

3. The compound of claim 1 which is 3-n-dodecylthio-4-hydroxycoumarin.

4. The compound of claim 1 which is 3-allylthio-4-hydroxycoumarin.

5. The compound of claim 1 which is 3-isopropylsulfinyl-4-hydroxycoumarin.

6. The compound of claim 1 which is 3-isopentylsulfinyl-4-hydroxycoumarin.

7. The compound of claim 1 which is 3-allylsulfinyl-4-hydroxycoumarin.

8. The compound of claim 1 which is 3-isopropylsulfonyl-4-hydroxycoumarin.

9. The compound of claim 1 which is 3-isopropylthio-4-hydroxycoumarin.

10. The compound of claim 1 which is 3-[2-(methylthio)ethylthio]-4-hydroxycoumarin.

11. The compound of claim 1 which is 3-isobutylthio-4-hydroxycoumarin.

12. The compound of claim 1 which is 3-cyclohexylmethylthio-4-hydroxycoumarin.

13. The compound of claim 1 which is 3-(4-chlorobenzylthio)-4-hydroxycoumarin.

14. The compound of claim 1 which is 3-(4-methylbenzylthio)-4-hydroxycoumarin.

15. The compound of claim 1 which is 3-(4-nitrobenzylthio)-4-hydroxycoumarin.

16. The compound of claim 1 which is 3-isobutylsulfinyl-4-hydroxycoumarin.

17. The compound of claim 1 which is 3-isopropylthio-4-hydroxycoumarin.

18. Process for making a sulfur-containing 4-hydroxycoumarin derivative corresponding to the formula

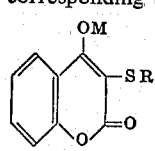

wherein M represents hydrogen or alkali metal, R represents alkyl of from 1 to 20 carbon atoms, ω-(cyclohexyl)-n-lower alkyl, benzyl, halobenzyl, lower alkylbenzyl, (trifluoromethyl)benzyl, nitrobenzyl, allyl, haloallyl, phenyl-lower alkyl or naphthyl-lower alkyl, which comprises mixing substantially equimolar proportions of an alkali metal or tertiary amine salt of a 4-hydroxycoumarin with an alkyl or aryl ester of an alkane- or arenethiosulfonic acid, water and a water-miscible organic solvent at a temperature between about 20° C. up to reflux temperature to substantial completion of the reaction; and recovering product 3-alkyl- or arylthio-4-hydroxycoumarin derivative.

19. The process of claim 18 wherein the said 3-alkyl- or arylthio-4-hydroxycoumarin derivative is oxidized with (a) a substantially equimolar proportion of hydrogen peroxide at substantially room temperature in the presence of glacial acetic acid as solvent to give the corresponding sulfinyl derivative or (b) with substantially two molar proportions of hydrogen peroxide in the presence of glacial acetic acid as solvent at a reaction temperature of about 20° C. to about 115° C. to give the corresponding sulfonyl derivative or (c) oxidizing the sulfinyl derivative as obtained in (a) with a substantially equimolar proportion of hydrogen peroxide in the presence of glacial acetic acid as solvent at about 20° C. to about 115° C.; and recovering the respective sulfinyl or sulfonyl derivative product.

References Cited

UNITED STATES PATENTS 2,471,047   5/1949   Stahmann et al. _____ 260—343.2

JOHN M. FORD, Primary Examiner

U.S. Cl. X.R.

424—279

PO-1050
(5/69)

UNITED STATES PATENT OFFICE
CERTIFICATE OF CORRECTION

Patent No. 3,810,922    Dated May 14, 1974

Inventor(s) Joseph E. Dunbar

It is certified that error appears in the above-identified patent and that said Letters Patent are hereby corrected as shown below:

Column 1, line 15, the formula should appear as follows:

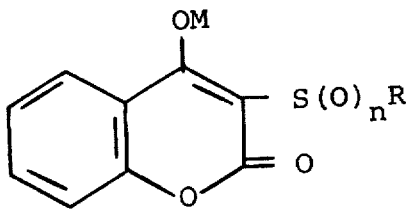

Column 3, line 67, "$C_{14}H_{25}O_3S$" should read -- $C_{14}H_{16}O_3S$ --;

Column 7, line 62, insert "g." after "16.2";

Column 8, line 26, insert "g." after "27.8";

Column 9, line 28, "different" should be -- difference --;

Column 9, line 74, correct spelling of "antimicrobial";

Signed and sealed this 29th day of October 1974.

(SEAL)
Attest:

McCOY M. GIBSON JR.
Attesting Officer

C. MARSHALL DANN
Commissioner of Patents

C-16,394